(12) United States Patent
Lee et al.

(10) Patent No.: US 9,547,488 B2
(45) Date of Patent: Jan. 17, 2017

(54) FIRMWARE UPDATE SYSTEM FOR VIDEO SECURITY EQUIPMENT

(71) Applicant: IDIS CO., LTD., Daejeon-si (KR)

(72) Inventors: Sang Hoon Lee, Seoul (KR); In Taek Lim, Goyang-si (KR); Sang Hyun Park, Seongnam-si (KR)

(73) Assignee: IDIS CO., LTD., Daejeon-si (KR)

( * ) Notice: Subject to any disclaimer, the term of this patent is extended or adjusted under 35 U.S.C. 154(b) by 48 days.

(21) Appl. No.: 14/610,530

(22) Filed: Jan. 30, 2015

(65) Prior Publication Data

US 2016/0210133 A1    Jul. 21, 2016

(30) Foreign Application Priority Data

Jan. 15, 2015   (KR) .......................... 10-2015-0007508

(51) Int. Cl.
| | | |
|---|---|---|
| *G06F 9/44* | (2006.01) | |
| *G06F 9/445* | (2006.01) | |
| *H04N 7/18* | (2006.01) | |
| *G06F 21/57* | (2013.01) | |
| *H04L 29/06* | (2006.01) | |
| *H04L 29/08* | (2006.01) | |

(52) U.S. Cl.
CPC .............. *G06F 8/65* (2013.01); *G06F 21/572* (2013.01); *H04L 63/20* (2013.01); *H04N 7/181* (2013.01); *H04L 67/34* (2013.01)

(58) Field of Classification Search
CPC ........................................................ G06F 8/65
USPC ................................................. 717/168–178
See application file for complete search history.

(56) References Cited

U.S. PATENT DOCUMENTS

| | | | | |
|---|---|---|---|---|
| 6,058,268 A | * | 5/2000 | Maeno ................... | G03B 43/00 396/281 |
| 7,515,560 B2 | * | 4/2009 | DuMas .................. | H04L 45/00 370/260 |
| 7,536,594 B2 | * | 5/2009 | Schaff ................... | G06F 1/3203 714/23 |
| 7,904,608 B2 | * | 3/2011 | Price ........................ | G06F 8/65 710/10 |

(Continued)

FOREIGN PATENT DOCUMENTS

| | | |
|---|---|---|
| KR | 10-2006-0019893 A | 3/2006 |
| KR | 10-2006-0064405 A | 6/2006 |

(Continued)

OTHER PUBLICATIONS

Software Automated Testing: A Solution to Cover Maximum Test Plan and to Increase Software Quality—G.Srikanth and R. Venkata Ramana Chary—International Journal of Computer Applications, vol. 34—No. 10, Nov. 2011.*

(Continued)

*Primary Examiner* — Francisco Aponte
(74) *Attorney, Agent, or Firm* — NSIP Law

(57) ABSTRACT

A firmware update system includes video security equipment and an update server. When receiving an error report from the video security equipment, the update server assigns a unique code to the error, and provides patch data matched with the error code to the video security equipment, which has reported the error that corresponds to the error code, to update firmware based on the patch data, thereby minimizing a security gap during the firmware update of the video security equipment.

8 Claims, 4 Drawing Sheets

(56) References Cited

U.S. PATENT DOCUMENTS

| | | | | |
|---|---|---|---|---|
| 8,001,418 | B2* | 8/2011 | Michaelson | G06F 11/2025 714/11 |
| 8,433,946 | B2* | 4/2013 | Michaelson | G06F 11/2025 714/4.11 |
| 8,739,151 | B1* | 5/2014 | Racz | G06F 8/67 717/168 |
| 8,898,510 | B2* | 11/2014 | Michaelson | G06F 11/2025 714/4.11 |
| 2004/0003266 | A1* | 1/2004 | Moshir | G06F 8/65 713/191 |
| 2007/0050678 | A1 | 3/2007 | Estes et al. | |
| 2010/0013941 | A1* | 1/2010 | Berkey | H04N 5/23203 348/211.1 |
| 2011/0125926 | A1* | 5/2011 | Price | G06F 8/65 710/1 |
| 2012/0192173 | A1* | 7/2012 | Price | G06F 8/65 717/172 |
| 2013/0188792 | A1* | 7/2013 | Renkis | G08B 13/19615 380/270 |
| 2014/0354820 | A1* | 12/2014 | Danialian | G06K 9/00771 348/154 |
| 2015/0220319 | A1* | 8/2015 | Weiss | G06F 8/665 713/168 |
| 2016/0080205 | A1* | 3/2016 | Brown | H04L 41/0853 709/220 |

FOREIGN PATENT DOCUMENTS

| | | |
|---|---|---|
| KR | 10-2007-0070562 A | 7/2007 |
| KR | 10-2008-0036660 A | 4/2008 |

OTHER PUBLICATIONS

Journal of Applied Computer Science, No. 5 (3) /2009, Suceava—Managed Video as a Service for a Video Surveillance Model-Dan Benţa -Babeş -Bolyai University of Cluj-Napoca.*

Using Network Attached Storage for IP-Surveillance Bottleneck analysis and developing a method for testing Network Attached Storage performance for IP-surveillance—Jun. 2013—Joakim Nymberg—School of Information Science, Computer and Electrical Engineering—Halmstad University—Halmstad Sweden.*

* cited by examiner

FIRMWARE UPDATE SYSTEM FOR VIDEO SECURITY EQUIPMENT

CROSS-REFERENCE TO RELATED APPLICATION(S)

This application claims priority from Korean Patent Application No. 10-2015-0007508, filed on Jan. 15, 2015, in the Korean Intellectual Property Office, the disclosure of which is incorporated herein by reference in its entirety.

BACKGROUND

1. Field

The following description relates to firmware update, such as a network video recorder (NVR) or video management software (VMS), and more particularly, to a firmware update system for minimizing a security gap in video security equipment.

2. Description of the Related Art

Korean published patent application No. 10-2006-0019893 (published on Mar. 6, 2006) discloses a technology that a server updates software for multiple digital video recorders (DVRs) over a network.

If a security function of video security equipment, such as a network video recorder (NVR) or video management software (VMS) stops during the update of firmware, a security gap may take place.

For this reason, users of the video security equipment tend to refrain from the firmware update. Thus, there is a need for a technology to update firmware of the video security equipment with the minimum security gap.

SUMMARY

The following description relates to a firmware update system for minimizing a security gap in video security equipment.

In one general aspect, there is provided a firmware update system for minimizing a security gap in a video security equipment, the firmware update system including: an update server comprising: an information register configured to receive from the video security equipment video security equipment information and IP camera information about IP cameras connected to the video security equipment and to register the received information; an error code assigner configured to, in response to receiving an error report from the video security equipment registered by the information register, assign a unique error code to the reported error; a patch data storer configured to match patch data with the error code assigned by the error code assigner and store the matched patch data; and a patch provider configured to provide the error-code-matched patch data from the patch data storer to the video security equipment that has reported the error that corresponds to the error code.

The update server may include a patch notifier configured to notify to the video security equipment that has reported the error or a user of the video security equipment that a patch to fix the error has been ready.

The update server may further include a remote tester configured to request the video security equipment, which has reported the error, to proxy a control command to test an IP camera in which the error has occurred, and to receive IP camera response information proxied by the error-reported video security equipment in relation to the control command so as to test the IP camera in which the error has occurred.

In another general aspect, there is provided a firmware update system for minimizing a security gap in a video security equipment, the firmware update system including: the video security equipment comprising: a camera information collector configured to IP camera information about IP cameras connected to the video security equipment; an information provider configured to provide the IP camera information collected by the camera information collector and video security equipment information to an update server; an error reporter configured to, when an error has occurred, report the error to the update server; and an updater configured to receive patch data that corresponds to the reported error from the update server and update firmware by reflecting the received patch data to the firmware of the video security equipment.

The updater may be configured to update the firmware by automatically reflecting the patch data matched with an error code, without user's manipulation.

The updater may be configured to update the firmware by manually reflecting the patch data matched with an error code to the firmware according to user's manipulation.

The error reporter may be configured to determine whether an IP camera is supported by the video security equipment based on the IP camera information collected by the camera information collector, and in response to a determination that the IP camera is not supported, report the error to the update server.

The error reporter may be configured to send capturing information of network packets that are exchanged between the video security equipment and the IP camera and information about an order of IP camera control operation of the video security equipment by including the information in the error report.

The updater may be configured to receive patch data from the update server corresponding to the reported error and update the firmware by reflecting the received patch data to the firmware when the update server notifies to the updater that the patch to fix the error has been ready.

The video security equipment may further include a proxier configured to proxy a control command from the update server to an IP camera in which the error has occurred so as to test the IP camera, and to proxy IP camera response information to the update server from the IP camera in response to the control command.

Other features and aspects will be apparent from the following detailed description, the drawings, and the claims.

Figure 1:
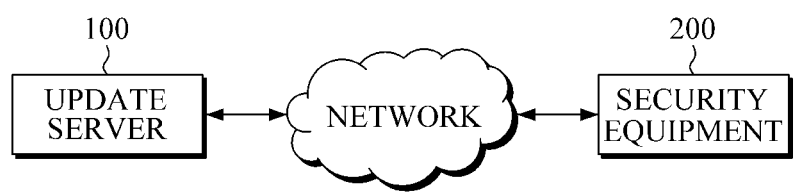
FIG. 1 is a diagram illustrating a firmware update system for minimizing a security gap in video security equipment according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present invention now will be described more fully hereinafter with reference to the accompanying figures. In the following description, a detailed description of known functions and configurations incorporated herein will be omitted when it may obscure the subject matter with unnecessary detail. Terms used throughout this specification are defined in consideration of functions according to exemplary embodiments, and can be varied according to a purpose of a user or manager, or precedent and so on. Therefore, definitions of the terms should be made on the basis of the overall context.

FIG. 1 is a diagram illustrating a firmware update system for minimizing a security gap in video security equipment according to an exemplary embodiment. Referring to FIG. 1, the firmware update system includes an update server 100 and video security equipment 200.

The update server 100 provides the video security equipment 200 with patch data to fix an error reported by the video security equipment 200, allowing the video security equipment 200 to update its firmware without a "security gap" that may take place when the security function of the video security equipment 200 stops during the firmware update.

For example, the errors reported by the video security equipment 200 may relate to, but not be limited to, event settings and/or pan/tilt control of an IP camera.

When an error occurs, the video security equipment 200 issues a report to the update server 100 regarding the error, receives patch data to fix the error from the update server 100 and then updates the firmware.

In this case, the video security equipment 200 may be a network video recorder (NVR) or video management software (VMS), and the patch data may relate to, but not be limited to, the event settings and/or pan/tilt control of an IP camera.

Figure 2:
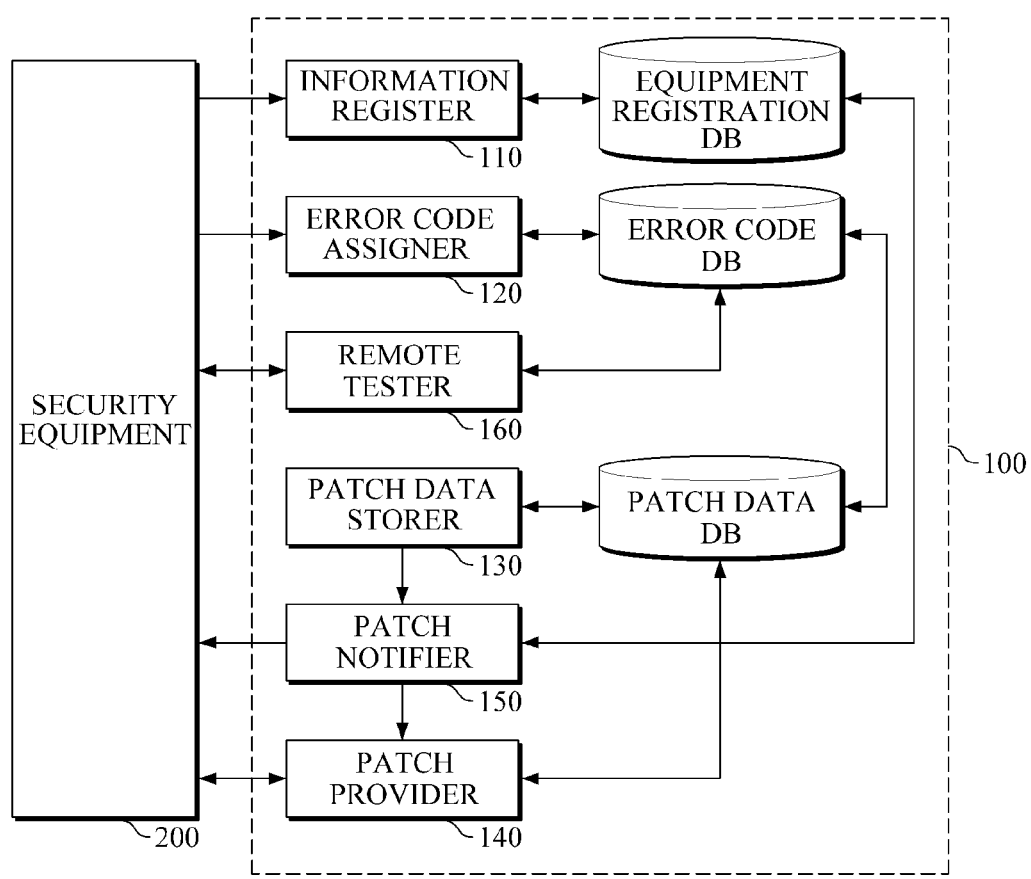
FIG. 2 is a block diagram illustrating an example of a configuration of an update server of a firmware update system for minimizing a security gap in video security equipment.

FIG. 2 is a block diagram illustrating an example of a configuration of an update server of a firmware update system for minimizing a security gap in video security equipment. Referring to FIG. 2, the firmware update system includes the update server 100 that includes an information register 110, an error code assigner 120, a patch data storer 130, and a patch provider 140.

The information register 110 receives from the video security equipment 200 the information about video security equipment and information about an IP camera connected to the video security equipment 200, and registers the received information. The video security equipment information and IP camera information registered by the information register 110 may be stored in an equipment registration database (DB).

In this case, the video security equipment information may include identification information, such as, a product name or electrical serial number of the video security equipment, and version information of firmware mounted in the video security equipment. In addition, the IP camera information may include information regarding a manufacturer, a product name, or the version of the IP camera, information regarding whether to use the IP camera, and the like.

The error code assigner 120 assigns a unique error code to an error reported by the video security equipment 200 that has been registered by the information register 110. The error code assigned by the error code assigner 120 may be matched up with the corresponding error and stored in the error code DB.

In this case, if the error code assigner 120 has already assigned a unique error code to the currently reported error, it does not assign a new error code to the current error, thereby preventing redundant assignment of an error code to the same error.

The patch data storer 130 matches patch data with the error code assigned by the error code assigner 120 and stores the matched patch data. The patch data storer 130 may store the matched patch data in a patch data DB.

The patch provider 140 provides the error-code-matched patch data from the patch data storer 130 to the video security equipment 200 that has reported the error that corresponds to the matched error code.

Then, in response to receiving from the update server 100 the patch data to fix the error, the video security equipment 200 updates its own firmware by applying only the patch data matched with the error code that corresponds to the reported error, and thus can minimize a security gap during the firmware update.

According to the aforementioned embodiments, when the video security equipment reports an error, the update server assigns a unique error code to the reported error, provides patch data that have been matched with the error code to the video security equipment that has reported an error corresponding to the error code, and updates the firmware of the video security equipment, thereby minimizing a security gap during the firmware update.

In another general aspect, the update server 100 may further include a patch notifier 150. The patch notifier 150 notifies the video security equipment 200 or a user of the equipment that a patch for fixing the error is ready and available.

For example, a developer may program and compile a patch code for fixing the error and store the resulting patch code in the patch data DB of the update server 100, and the patch notifier 150 is configured to notify that the patch data to fix the error are ready by sending a message to the video security equipment 200 or a mobile communication terminal owned by the user of the video security equipment.

In another general aspect, the update server 100 may further include a remote tester 160. The remote tester 160 requests the video security equipment 200, which has reported an error, to proxy a control command to test an IP camera that has an error. Then, the remote tester 160 receives IP camera response information proxied by the video security equipment 200 regarding the control command, and tests the pertinent IP camera.

A developer wants to provide a correct patch for the error reported by the video security equipment 200. If a remote test for the IP camera in which the error has occurred is possible, the developer may be able to clearly discern the reported problem and cope with the error.

Thus, the update server 100 may send the control command for IP camera test to the IP camera that has been reported to have an error through the remote tester 160, receive the IP camera response information in relation to the control command and analyze the received response information to conduct the remote test for the defective IP camera.

In the above process, the video security equipment 200 only serves to proxy the control command for the remote test for the defective IP camera and IP camera response information corresponding to the control command.

Figure 3:
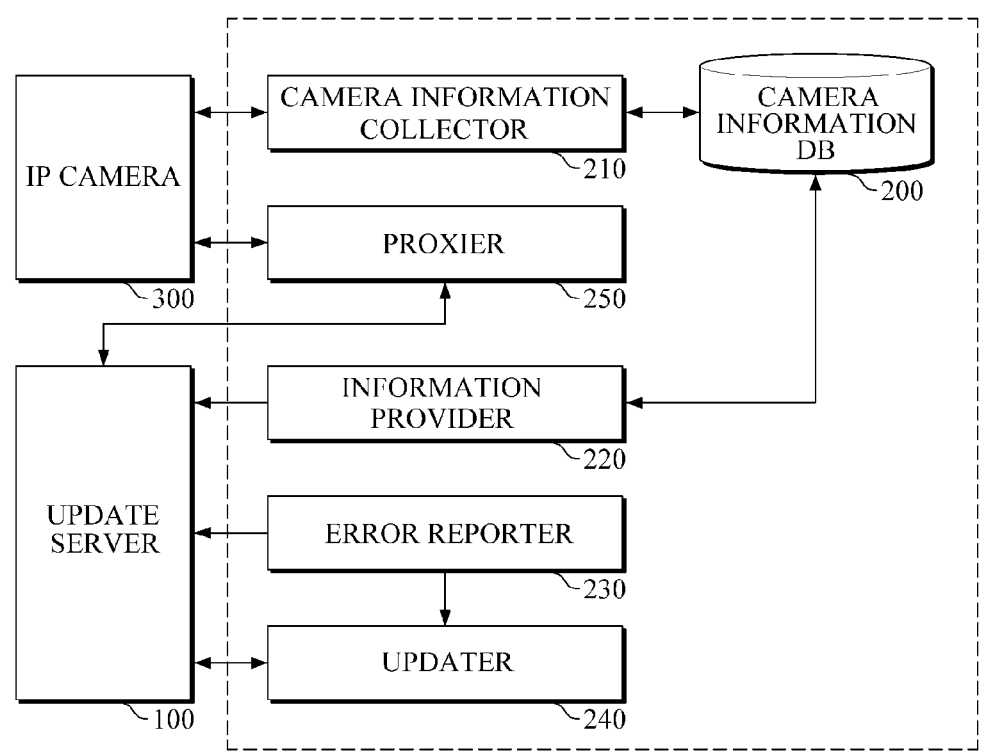
FIG. 3 is a block diagram illustrating an example of video security equipment of a firmware update system for minimizing a security gap in the vide security equipment.

FIG. 3 is a block diagram illustrating an example of video security equipment of a firmware update system for minimizing a security gap in the vide security equipment. Referring to FIG. 3, video security equipment 200 of the firmware update system for minimizing a security gap includes a camera information collector 210, an information provider 220, an error reporter 230, and an updater 240.

The camera information collector 210 collects information about an IP camera 300 connected to the video security equipment 200. IP camera manufacturers manufacture IP cameras in accordance with standards, such as Open Network Video Interface Forum (ONVIF), or Physical Security Interoperability Alliance (PSIA).

When each IP camera manufactured in accordance with the standards is connected to a camera connection port of the video security equipment 200, the camera information collector 210 is able to recognize and collect the information about the IP camera, such as the IP camera manufacturer, a product name, a version, and the like of the IP camera.

The information provider 220 provides the IP camera information collected by the information collector 210 and the video security equipment information to the update server 100. The video security equipment information may include the identification information, such as the product name or electrical serial number of the video security equipment, and firmware version information of the video security equipment.

When an error has occurred, the error reporter 230 reports the error to the update server 100. For example, the error to be reported by the error reporter 230 may relate to, but not be limited to, event stings and pan/tilt control of an IP camera.

The error reporter 230 may be configured to determine whether or not the IP camera is supported by the video security equipment based on IP camera information collected by the camera information collector 210, and, if the IP camera is determined as not being supported, then report the error to the update server 100.

At the time of release, a list of supportable IP cameras is stored by default in a memory (not shown) of the video security equipment 200. When a user of the video security equipment 200 connects an IP camera to an IP camera connection port on the video security equipment 200, the camera information collector 210 collects IP camera information, and searches the IP camera list stored in the memory for an IP camera corresponding to the IP camera information to determine whether or not the connected IP camera is supported by the video security equipment 200.

If it is determined that the IP camera is not supported, any errors may occur since event settings and/or pan/tilt control for IP camera operation vary depending on camera manufacturers. The error reporter 230 reports to the update server 100 any errors related to event settings or pan/tilt control of the IP camera that is not supported by the video security equipment 200.

In addition, the error reporter 230 may be configured to send capturing information of network packets that are exchanged between the video security equipment and the IP camera or information about the order of IP camera control operation of the video security equipment, along with the error report.

The capturing information of network packets that are exchanged between the video security equipment and the IP camera or the information about the order of IP camera control operation of the video security equipment can help a developer to fix the error, and thus such information may be included in the error report and is provided to contribute to the development of patch code for the error fixes.

The updater 240 updates the firmware of the video security equipment 200 by reflecting patch data that are sent from the update server 100 corresponding to the reported error.

For example, the patch data may relate to, but not be limited to, event settings or pan/tilt control of an IP camera.

In this case, the updater 240 may be configured to update firmware by automatically reflecting the patch data matched with an error code to the firmware, without user's manipulation.

Alternatively, the updater 240 may be configured to update firmware by manually reflecting the patch data matched with the error code to the firmware according to the user's manipulation.

The updater 240 may be configured to receive patch data from the update server 100 corresponding to the reported error and update firmware by reflecting the received patch data to the firmware when the update server 100 notifies to the updater 240 that the patch to fix the error has been ready.

According to the above embodiments, the video security equipment reports any occurring error to the update server, and updates its own firmware by receiving from the update server patch data matched with an error code that corresponds to the reported error, thereby minimizing a security gap during the firmware update of the video security equipment.

In another general aspect, the video security equipment 200 may further include a proxier 250. The proxier 250 proxies a control command from the update server 100 to an IP camera in which the error has occurred in order to test the IP camera. Also, in response to the control command, the proxier 250 proxies IP camera response information to the update server from the IP camera.

The developer wants to provide a correct patch for the error reported by the video security equipment 200. If a remote test for the IP camera in which the error has occurred is possible, the developer may be able to clearly discern the reported problem and cope with the error.

The developer may send the control command for IP camera test through the remote tester 160 of the update server 100 to the IP camera with the error, and receives and analyzes IP camera response information related to the control command to conduct the remote test for the IP camera with the error.

During the above process, the video security equipment 200 may use the proxier 250 to simply proxy the control command for remote test for the IP camera in which the error has occurred and the IP camera response information corresponding to the control command.

Figure 4:
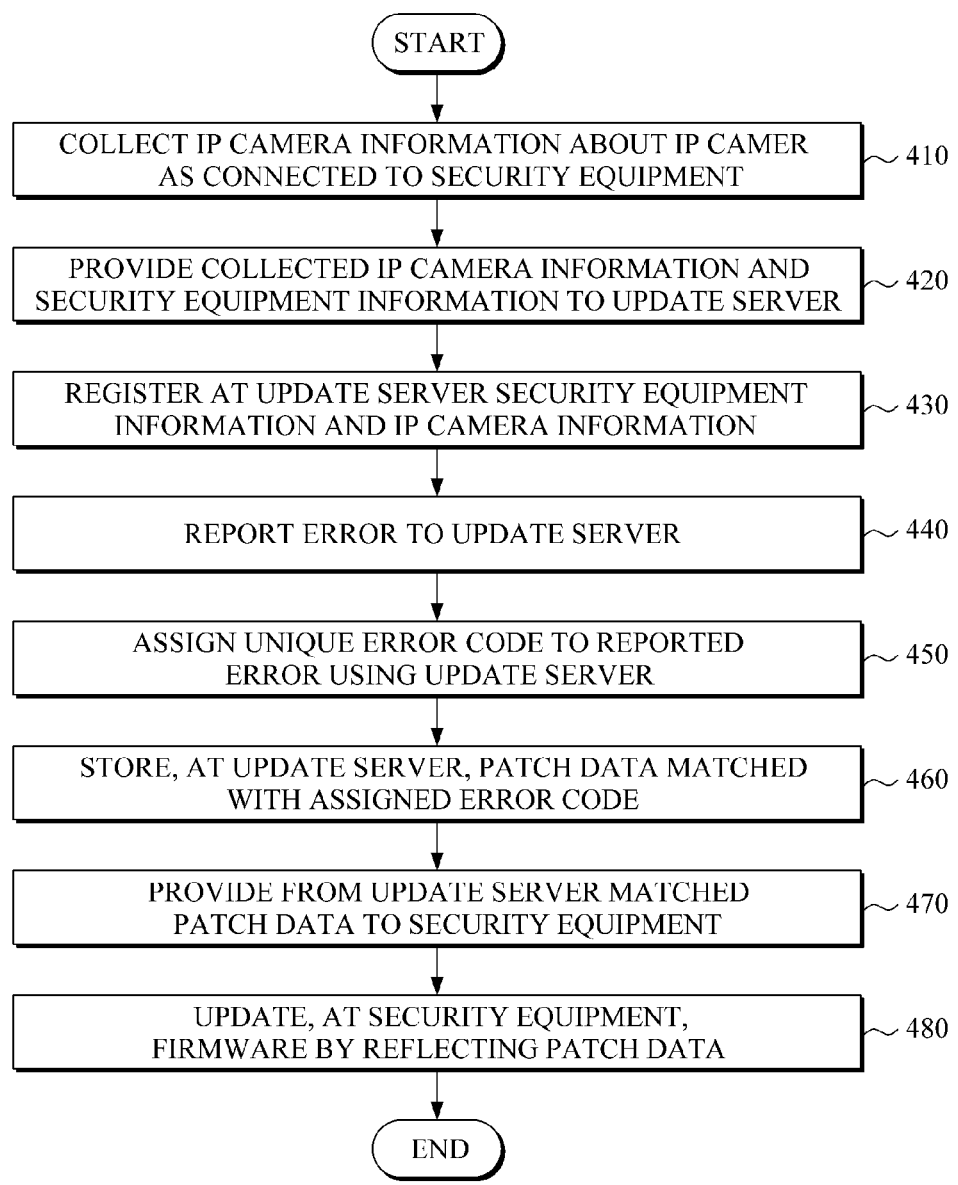
FIG. 4 is a flowchart illustrating an example of firmware update process of the firmware update system for minimizing a security gap in the video security equipment according to an exemplary embodiment.

A firmware update process of the firmware update system for minimizing a security gap in the video security equipment as described above will be described with reference to FIG. 4. FIG. 4 is a flowchart illustrating an example of firmware update process of the firmware update system for minimizing a security gap in the video security equipment according to an exemplary embodiment.

First, in 410, the video security equipment collects IP camera information about IP cameras connected to the video security equipment.

In 420, the video security equipment provides the IP camera information collected in 410 and video security equipment information to an update server.

In 430, the update server receives the video security equipment information and the IP camera information from the video security equipment and registers the received information.

In 440, if an error has occurred in the video security equipment, the video security equipment reports the error to the update server.

In 450, the update server assigns a unique error code to the error reported by the video security equipment.

Then, once a developer has created a patch to fix the reported error, the update server matches the error code assigned in 450 with patch data and stores the matched patch data in 460.

Then, in 470, the update server provides the patch data matched with the error code to the video security equipment that has reported the error that corresponds to the error code.

In 480, in response to the patch data from the update server, the video security equipment updates its own firmware by reflecting the patch data to the firmware.

By doing so, at the time of error report from the video security equipment, the update server assigns the unique error code to the error, and provides the patch data matched with the error code to the video security equipment that has reported the error that corresponds to the error code, so that the video security equipment can update its own firmware by reflecting the patch data, and thereby minimize a security gap during the firmware update.

The above exemplary embodiments may be industrially applicable to firmware update technologies, such as network video recorders (NVRs) or video management software (VMS), and the applications thereof.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A firmware update system for minimizing a security gap in a video security equipment, the firmware update system comprising:
   video security equipment configured to proxy a control command for a remote test of one or more defective IP cameras, and to proxy IP camera response information corresponding to the control command, the video security equipment comprising:
   a camera information collector configured to collect IP camera information about IP cameras connected to the video security equipment,
   an information provider configured to provide the IP camera information collected by the camera information collector, and video security equipment information, to an update server,
   an error reporter configured to, in response to an occurrence of an error, report the error to the update server, and
   an updater configured to receive, from the update server, patch data that corresponds to the reported error, and to update firmware by reflecting the received patch data to the firmware of the video security equipment; and
   an update server comprising:
   an information register configured to receive, from the video security equipment, video security equipment information and IP camera information about IP cameras connected to the video security equipment and to register the received information,
   an error code assigner configured to, in response to receiving an error report from the video security equipment registered by the information register, assign a unique error code to the reported error,
   a patch data storer configured to match patch data with the error code assigned by the error code assigner, and to store the matched patch data,
   a patch provider configured to provide the error-code-matched patch data from the patch data storer to the video security equipment that has reported the error that corresponds to the error code, and
   a remote tester configured
   to request that the video security equipment, which has reported the error, proxy a control command to test one or more defective IP cameras in which the error has occurred, and
   to receive IP camera response information proxied by the error-reported video security equipment, in relation to the control command,
   so as to test one or more defective IP cameras in which the error has occurred.

2. The firmware update system of claim 1, wherein the update server comprises a patch notifier configured to notify to the video security equipment that has reported the error, or to a user of the video security equipment, that a patch to fix the error is ready.

3. The firmware update system of claim 1, wherein the updater is configured to update the firmware, by automatically reflecting the patch data matched with the error code, without manipulation by the user.

4. The firmware update system of claim 1, wherein the updater is configured to update the firmware, by manually reflecting the patch data matched with the error code to the firmware, according to manipulation by the user.

5. The firmware update system of claim 1, wherein the error reporter is configured to
   determine whether one or more of the IP cameras is supported by the video security equipment, based on the IP camera information collected by the camera information collector, and in response to a determination that the IP camera is not supported, report the error to the update server.

6. The firmware update system of claim 5, wherein the error reporter is configured to send capturing information of network packets exchanged between the video security equipment and the IP camera, and information about an order of IP camera control operation of the video security equipment, by including the information in the error report.

7. The firmware update system of claim 1, wherein the updater is configured to receive patch data from the update server corresponding to the reported error, and to update the firmware by reflecting the received patch data to the firmware in response to the update server notifying the updater that a patch to fix the error is ready.

8. The firmware update system of claim 1, wherein the video security equipment further comprises a proxier configured to proxy a control command from the update server to the one or more defective IP cameras in which the error has occurred, so as to test the one or more defective IP cameras, and in response to the control command, to proxy IP camera response information to the update server from the one or more defective IP cameras.

* * * * *